(12) United States Patent  (10) Patent No.: US 9,314,042 B2
Abaurre  (45) Date of Patent: Apr. 19, 2016

(54) METHOD AND COMPOSITION USED FOR THE MANUFACTURE OF COFFEE LIQUOR

(71) Applicant: Flavio Da Cruz Abaurre, Vitoria (BR)

(72) Inventor: Flavio Da Cruz Abaurre, Vitoria (BR)

(73) Assignee: Tierra Nueva Fine Cocoa, LLC., Miami, FL (US)

( * ) Notice: Subject to any disclaimer, the term of this patent is extended or adjusted under 35 U.S.C. 154(b) by 421 days.

(21) Appl. No.: 13/685,261

(22) Filed: Nov. 26, 2012

(65) Prior Publication Data

US 2014/0147572 A1    May 29, 2014

(51) Int. Cl.
A23F 5/10 (2006.01)
A23F 5/08 (2006.01)
A23F 5/04 (2006.01)
A23F 5/14 (2006.01)
A23F 5/24 (2006.01)

(52) U.S. Cl.
CPC ... *A23F 5/04* (2013.01); *A23F 5/08* (2013.01); *A23F 5/14* (2013.01)

(58) Field of Classification Search
CPC ............... A23F 5/04; A23F 4/08; A23F 5/14
See application file for complete search history.

(56) References Cited

FOREIGN PATENT DOCUMENTS

WO   PCT/IT99/00014   8/1999

*Primary Examiner* — Erik Kashnikow
*Assistant Examiner* — Philip Dubois
(74) *Attorney, Agent, or Firm* — Jesus Sanchelima, Esq.; Christian Sanchelima, Esq.

(57) ABSTRACT

A method for preserving the aroma of coffee in chocolate products, comprising the steps of roasting and grounding the coffee beans, blending cocoa butter with the coffee beans and milling the coffee beans under inert atmosphere using a mill mesh between 16 and 30 microns resulting in a powdered product, homogenizing the resulting suspension of cocoa butter with the powdered product. Then lowering of the temperature of the resulting composite mass to a temperature between 28 and 29 degrees Celsius and holding it for a period of time not less than 5 minutes and no more than 10 minutes, molding the composite mass to predetermined shapes, and then lowering temperature, resulting in a solid product.

4 Claims, 1 Drawing Sheet

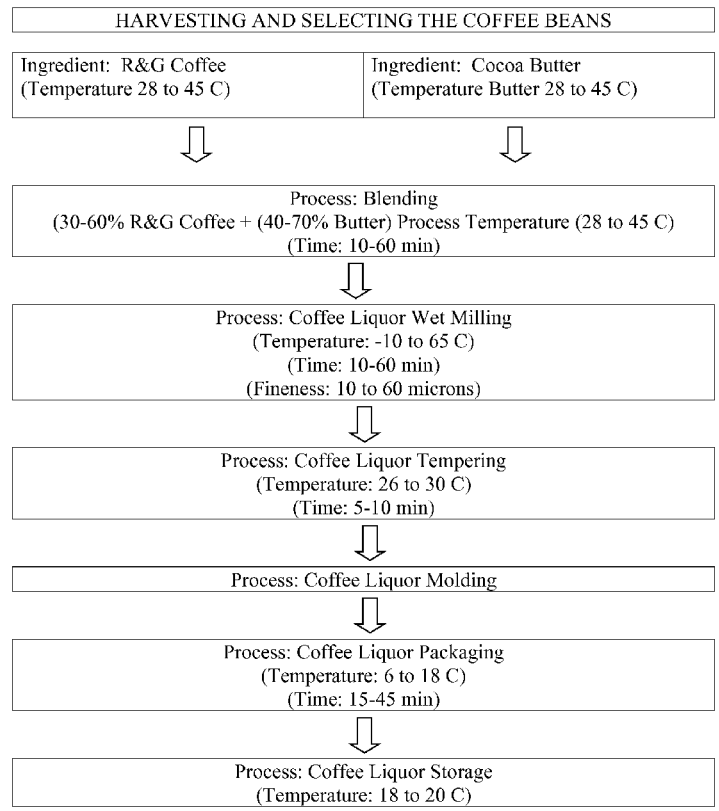

| HARVESTING AND SELECTING THE COFFEE BEANS |

| Ingredient: R&G Coffee (Temperature 28 to 45 C) | Ingredient: Cocoa Butter (Temperature Butter 28 to 45 C) |

 

Process: Blending
(30-60% R&G Coffee + (40-70% Butter) Process Temperature (28 to 45 C)
(Time: 10-60 min)

Process: Coffee Liquor Wet Milling
(Temperature: -10 to 65 C)
(Time: 10-60 min)
(Fineness: 10 to 60 microns)

Process: Coffee Liquor Tempering
(Temperature: 26 to 30 C)
(Time: 5-10 min)

Process: Coffee Liquor Molding

Process: Coffee Liquor Packaging
(Temperature: 6 to 18 C)
(Time: 15-45 min)

Process: Coffee Liquor Storage
(Temperature: 18 to 20 C)

METHOD AND COMPOSITION USED FOR THE MANUFACTURE OF COFFEE LIQUOR

BACKGROUND OF THE INVENTION

1. Field of the Invention

The present invention relates to a method and composition for the preservation of roasted and ground coffee.

2. Description of the Related Art

Several methods and compositions for the preservation of roasted and ground coffee have been implemented in the past. None of them, however, includes a specifically scaled proportion of cocoa butter, vegetable oils, and sugar that encapsulates the roasted ground coffee and thus conserves the aroma and flavor of the coffee.

The present invention refers to a manufacturing method for the production of a new food ingredient, from now on called "coffee liquor" (which may also be called "coffee mass"). This ingredient is able to preserve the sensory and aromatic properties of the R&G (Roasted & Ground) coffee for extensive period of time. Moreover, this invention also refers to the utilization of the said coffee liquor as an ingredient for the use of the R&G coffee in the formulation of edible, composite coffee bars in solid form.

The herein proposed method has the objective of preserving the organoleptical properties of the R&G coffee, through the preparation of coffee liquor and its utilization in the manufacturing of edible solid coffee bars. The coffee liquor is prepared through the encapsulation of finely milled R&G coffee with vegetable fat and/or cocoa butter, with the objective to confer the physical insulation of the coffee's microparticles from the atmospheric air, thus preventing that oxidative action happens to its aromatic and sensory components through means of their exposure and chemical reaction with the oxygen present in the atmospheric air.

The method of this present invention was developed to render food-based coffee bars in solid form from coffee liquor, which then allows the food consumption of solid form R&G coffee beans in its entirely, either pure or composite, i.e., in combination with other food ingredients which are indicated as part of the formulation, such as: milk derivatives, cocoa powder, starches, maltodextrins, malt extracts, sugars, natural or artificial sweeteners, vitamins and mineral salts, among others.

The classical chocolate manufacturing method and the main equipment to accomplish the task are both of public knowledge information, and widely published in books and technical publications related to the Food Science, Technology and Engineering disciplines and widely know in the Food & Beverage Industries.

While originally developed from Aztec ideas that inhabited Mesoamerica, the chocolate process was initially brought to Europe by the Spaniards, who established the first industrial chocolate facility in the world in Spain. The process and technology remained for almost a Century as tight industrial secret, before the Spain monopoly came to an end. Since the XVI Century chocolate science, technology and engineering has been evolving continuously, receiving contributions from many inventors from various countries, especially from England, France, Holland, and Germany, and more recently from the US, among several other nations.

The chocolate technical evolution had significant improvement in both processing and equipment, particularly from the beginning of the Industrial Revolution, and continuously evolved to reach the today's notable state of quality, precision and volume of the chocolate's modern industrial processing technology.

The classic process for manufacturing of chocolate masses and compounds (i.e. imitation chocolates), as it stands today, has the objective of properly developing and controlling three (3) key variables that impart in the quality and functionality of the end product, as follows:

The taste & flavor (or sensorial properties)

The texture (or rheological properties)

The conditioning of the mass (or its physical and physical chemical properties.

They all are critically important for the proper mass preparation, presentation, attraction and consumption of the end chocolate or compound products. For instance, both the chocolate and compound masses, made with alternative vegetable fat and cocoa liquor are heavily influenced in their functional properties, by their proper conditioning and their application by both their static and dynamic viscosities (yield value).

Applicant believes that the closest reference corresponds to international application No. PCT/IT99/00014 issued to Danillo Rossi for an alimentary product based on coffee, cocoa, and guarana. This reference includes coffee and cocoa, like in this invention. However, the reference differs from the present invention in failing to disclose the use of a vegetable oil (including cocoa butter) to encapsulate the aroma of the milled roasted ground coffee for preservation. Rossi's disclosure is related to an alimentary product and it does not disclose the method claimed herein.

Other patent applications or patents describing the related subject matter provide for a number of more or less ingredients that fail to address the preservation problem in an efficient and economical way. None of these patents suggest the novel features of the present invention.

SUMMARY OF THE INVENTION

It is one of the objects of this invention to provide a method for encapsulating and preserving the aroma of coffee with cocoa butter resulting in a coffee product.

It is another object of the present invention to provide a method for preserving the coffee aroma in a chocolate product that is compatible with existing equipment for the production of chocolate.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a flowchart with the main steps of the method.

DETAILED DESCRIPTION OF THE INVENTION

The composition in the present invention includes using vegetable oils/fats and sugar to create an emulsion for the encapsulation of the aroma and flavor of roasted ground coffee. In one of the embodiments, the method includes the following steps:

A) The harvested and selected coffee beans are roasted and grounded (R& G) keeping the temperature between 110° and 180° C. (Celsius or Centigrade) between 15 and 45 minutes. The specific temperature and time selected depend on the coffee variety and desired roasting effect. This roasting process is known by those trained and experienced in the art in order to develop the coffee's aroma and taste. The coffee beans are dry milled to reach a diameter between 75 and 110 microns in a conventional manner.

B) The temperature of the roasted and ground coffee beans is lowered between 28° and 45° C. under fluid bed air, equipped with mechanical agitation. The temperature is typically ambient temperature. The objective in this step is to quench the degradation (aroma exiting the beans) from the roasting step (at a higher temperature). This step is known and practiced by those learned in the art.

C) Lowering the temperature of the beans further to a temperature between 10° and −10° C., preferably using a cryogenic cooler with inert gas. The beans are kept at a temperature range between 10 minutes and 60 minutes.

D) Milling the roasted and ground beans in suspension to a diameter that ranges from 10 microns to 60 microns while under the inert gas atmosphere at the temperature that is kept between −10° to 65° for the time period mentioned in the previous step.

E) Blending the milled beans with cocoa butter in a mixer. The resulting mass or product with the milled beans in suspension will have 30 to 60% of R &G coffee and 70% to 40% of cocoa butter with respect to the total weight. The temperature is kept between 28° and 45° C. for a time period that ranges from 10 to 60 minutes.

F) Tempering the resulting mass by the temperature to between 26° and 30° C. for a period that should be no shorter than 5 minutes and no longer than 10 minutes. The product is progressively cooled and then re-heated through a scrapped surface heat exchanger. It is also possible to utilize either a coffee expresso tempering or coffee with milk tempering or other variations.

G) The product is then molded to the desired shape and cooled for solidification.

H) The temperature is lowered to between 6° and 18° C. in a cooling channel, with residence time between 15 minutes and 45 minutes.

The product is then stored, as finished product, at a temperature between 18° and 20°, preferably.

It is possible also to utilize different liquified vegetable fat and cocoa butter has provided good results.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for manufacturing coffee liquor preserving the aroma of coffee products, comprising the steps of:
    A) roasting and grounding the harvested and selected coffee beans keeping the temperature between 110° and 180° C. between 15 and 45 minutes and the beans are milled to reach a diameter between 75 and 110 microns;
    B) first lowering the temperature step to keep the coffee beans at a temperature that ranges between 28° and 45° C. in an air bed with mechanical agitation;
    C) second lowering of the temperature step to keep the roasted and ground coffee beans at a temperature between 10° and −10° C. for a time period that ranges from 10 minutes and 60 minutes in an inert gas atmosphere;
    D) milling the beans to a diameter that ranges from 15 microns to 30 microns while in said inert gas atmosphere and at the temperature described in the previous step to preserve the aroma of the coffee beans;
    E) blending the milled beans with cocoa butter in a mixer to bring resulting coffee liquor mass having the milled beans in suspension to have between 30% to 60% of said roasted and ground coffee beans and between 70% and 40% of cocoa butter with respect to the total weight of the resulting coffee liquor mass;
    F) bringing the temperature of said mass between 26° and 30° C. for a period that should be no shorter than 5 minutes and no longer than 24 hours;
    G) molding the mass to the desired shape; and
    H) fourth lowering the temperature step to keep said mass at a temperature in a range between 6° and 18° C. and keeping said mass at this temperature between 15 minutes and 45 minutes.

2. The method set forth in claim 1 wherein said second lowering the temperature step includes the use of a cryogenic cooler.

3. The method set forth in claim 2 wherein said milling step includes the use of a mill mesh.

4. The method set forth in claim 1 further including the step of processing said mass with a scrapped surface heat exchanger after said fourth lowering the temperature step.

* * * * *